US009720567B2

(12) United States Patent
Churchill et al.

(10) Patent No.: US 9,720,567 B2
(45) Date of Patent: Aug. 1, 2017

(54) MULTITASKING AND FULL SCREEN MENU CONTEXTS

(71) Applicant: Microsoft Technology Licensing, LLC, Redmond, WA (US)

(72) Inventors: John E. Churchill, Monroe, WA (US); Joseph Wheeler, Sammamish, WA (US); Jerome Jean-Louis Vasseur, Bothell, WA (US); Thomas Fuller, Seattle, WA (US); Jason Dean Giles, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 14/181,896

(22) Filed: Feb. 17, 2014

(65) Prior Publication Data
US 2015/0234545 A1 Aug. 20, 2015

(51) Int. Cl.
*G06F 3/0482* (2013.01)
*G06F 3/0484* (2013.01)
G06F 3/0481 (2013.01)
G06F 9/44 (2006.01)
H04N 5/445 (2011.01)

(52) U.S. Cl.
CPC ........ *G06F 3/0482* (2013.01); *G06F 3/04842* (2013.01); *G06F 3/04847* (2013.01); *G06F 3/0481* (2013.01); *G06F 9/4446* (2013.01); *H04N 5/445* (2013.01)

(58) Field of Classification Search
CPC ...... H04N 5/44591; H04N 2005/44595; G06F 2203/04803; G06F 9/46; G06F 9/52

USPC .................................. 715/767; 718/107, 108
See application file for complete search history.

(56) References Cited

U.S. PATENT DOCUMENTS

| 6,028,604 A * | 2/2000 | Matthews, III ....... G06F 3/0481 715/821 |
| 8,504,936 B2 | 8/2013 | Gimpl et al. |
| 2004/0027793 A1* | 2/2004 | Haraguchi et al. ........... 361/683 |

(Continued)

FOREIGN PATENT DOCUMENTS

| EP | 2296370 | 3/2011 |
| EP | 2296370 A1 | 3/2011 |

OTHER PUBLICATIONS

"Applications & Content Platforms", Retrieved from: <http://www.xroadmedia.com/applications-content-platforms/> Oct. 10, 2013, 2013, 1 Page.

(Continued)

*Primary Examiner* — Rinna Yi
(74) *Attorney, Agent, or Firm* — Workman Nydegger

(57) ABSTRACT

Multitasking and full screen menu contexts are described. In one or more implementations, an input is received to cause output of a menu in a user interface of a computing device. Responsive to this receipt, a determination is made as which of a plurality of portions displayed simultaneously in the user interface in a multitasking mode has focus, each of the plurality of portions corresponding to an output of a respective one of a plurality of applications. Responsive to the determination, output is caused of the menu as associated with the focused portion of the user interface and having a representation of at least one function based the focused portion, the representation selectable to cause performance of the function.

19 Claims, 7 Drawing Sheets

(56) References Cited

U.S. PATENT DOCUMENTS

| | | | |
|---|---|---|---|
| 2005/0039141 A1 | 2/2005 | Burke et al. | |
| 2011/0047512 A1* | 2/2011 | Onogi et al. | 715/836 |
| 2011/0113363 A1 | 5/2011 | Hunt et al. | |
| 2012/0072867 A1* | 3/2012 | Schlegel | 715/808 |
| 2012/0081310 A1 | 4/2012 | Schrock | |
| 2012/0129597 A1* | 5/2012 | Baszucki | 463/31 |
| 2012/0309526 A1 | 12/2012 | Nogami et al. | |
| 2013/0067394 A1* | 3/2013 | Nan et al. | 715/784 |
| 2013/0090164 A1* | 4/2013 | Moshal | 463/31 |
| 2013/0090930 A1 | 4/2013 | Monson et al. | |
| 2013/0252732 A1* | 9/2013 | Abeloe | 463/32 |
| 2014/0075330 A1* | 3/2014 | Kwon | 715/750 |
| 2014/0195953 A1* | 7/2014 | Sakai et al. | 715/771 |
| 2014/0304643 A1* | 10/2014 | Holland et al. | 715/781 |

OTHER PUBLICATIONS

Buckley, "Xbox One's 'Snap Mode' lets you use two apps simultaneously", Retrieved from: <http://www.engadget.com/2013/05/21/xbox-ones-snap-mode-lets-you-use-two-apps-simultaneously/> Oct. 11, 2013, May 21, 2013, 4 Pages.
"International Search Report and Written Opinion", Application No. PCT/US2015/015082, May 18, 2015, 10 pages.
Larie "A Useful Key in the Windows Keyboard That You May Have Overlooked", Sep. 19, 2011. Available at http://www.techsupportalert.com/content/useful-key-windows-keyboard-you-may-have-overlooked.htm.
Office Action issued in European Application No. 15708937.6 mailed Dec. 15, 2016.

\* cited by examiner

MULTITASKING AND FULL SCREEN MENU CONTEXTS

BACKGROUND

The functionality that is available to users of computing devices is ever increasing. One example of this involves the proliferation of applications that may be configured in a variety of different ways to support a variety of different functionality, e.g., from word processing and spreadsheets to Internet browsers, games, and so forth.

Because of the different functionality supported by the variety of different applications, each of these applications may be optimized to support inaction in a variety of different modes, e.g., a full screen mode for media viewing, a partial mode for targeted functionality such as weather, and so on. Additionally, functionality supported by some applications may be complimentary to other applications. Continuing with the previous example, an application may be configured to support output of a live sporting event and another application may be configured to support statistics associated with the event. Conventional techniques that were utilized to support this interaction, however, could be inflexible and lack intuitiveness and thus were often forgone on the part of a user.

SUMMARY

Multitasking and full screen menu contexts are described. In one or more implementations, an input is received to cause output of a menu in a user interface of a computing device. Responsive to this receipt, a determination is made as which of a plurality of portions displayed simultaneously in the user interface in a multitasking mode has focus, each of the plurality of portions corresponding to an output of a respective one of a plurality of applications. Responsive to the determination, output is caused of the menu as associated with the focused portion of the user interface and having a representation of at least one function based on the focused portion, the representation selectable to cause performance of the function.

In one or more implementations, a computing device includes a processing system and memory configured to maintain one or more instructions, the one or more instructions are executable by the processing system to cause operations to be performed. The operations include receiving an input to cause output of a menu in a user interface of a computing device and responsive to the receipt, ascertaining whether the user interface is in a full screen mode that supports output of a single application or in a multitasking mode in which simultaneous output of a plurality of applications is supported. The operations also include responsive to the ascertaining that the user interface is in the multitasking mode, determining which of the plurality of portions has focus and responsive to the determining, causing output of the menu as associated with the focused portion of the user interface and having a representation of at least one function based the focused portion, the representation selectable to cause performance of the function.

In one or more implementations, one or more computer-readable storage media comprise instructions stored thereon that, responsive to execution by a computing device, causes a computing device to perform operations. The operations include responsive to receipt of an input to cause output of a menu, ascertaining whether a user interface output by the computing device is in a full screen mode in which an output of a single application consumes an entirety of the user interface or in a multitasking module in which a plurality of portions are displayed concurrently in the user interface, each corresponding to a respective one of a plurality of applications. The operations also include responsive to the ascertaining, causing output of the menu as having different configurations of representations of functions when output as part of the full screen mode or in the multitasking mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computing devices may be configured to support a variety of different output modes. Examples of such modes include a full screen mode in which an entirety of a user interface output by a computing device and multitasking modes in which simultaneous output is supported for a plurality of applications. For example, a game console may support a full screen mode for viewing television and a multitasking mode for viewing the television program along with another application, e.g., a videoconferencing application. Other examples are also contemplated, such as an immersive shell for an operating system for a tablet, personal computer, and so on.

Multitasking and full screen menu contexts are described. In one or more implementations, a menu is configured for output based on a context in which it is displayed. This may include whether a user interface is in a full screen or multitasking mode as well as may include which portion of a user interface has focus in the multitasking mode. The configuration of the menu may include where the menu is displayed in the user interface, which representations of functions are included in the menu, and so on. In this way, the menu may be configured based on the context in which is displayed and further may do so automatically using common input techniques, e.g., the same inputs may be used to cause output of the menu regardless of the context of the menu. Further discussion of these and other features may be found in relation to the following sections.

In the following discussion, an example environment is first described that is operable to employ the described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
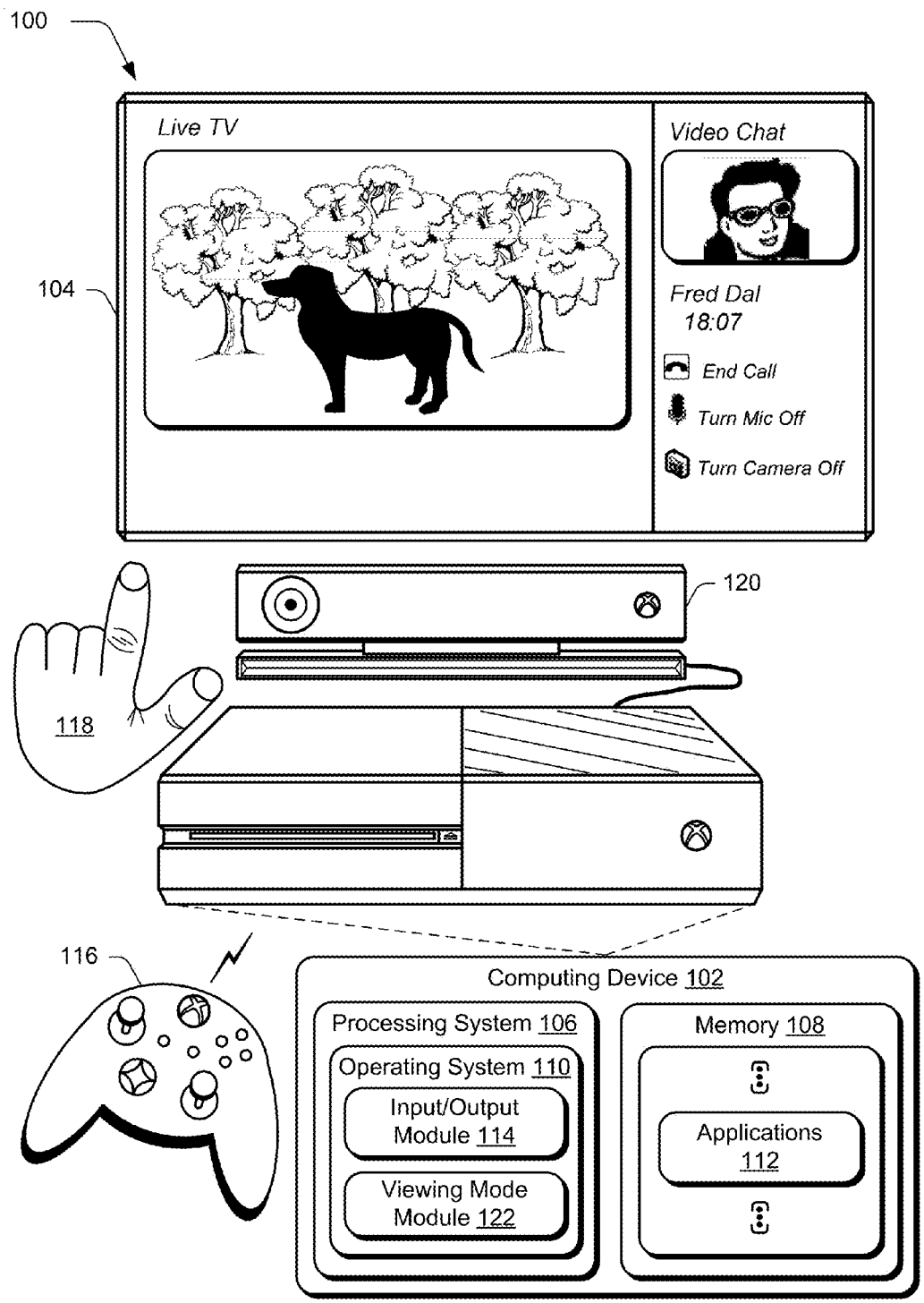
FIG. 1 is an illustration of an environment in an example implementation that is operable to employ techniques described herein.

FIG. 1 is an illustration of an environment 100 in an example implementation that is operable to employ the menu techniques described herein. The illustrated environment 100 includes an example of a computing device 102, which is illustrated as a game console that is communicatively coupled to a display device 104 (e.g., a television) but may be configured in a variety of other ways. For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 8. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a processing system 106 and an example of computer-readable storage media, which in this instance is memory 108. The processing system 106 is not limited by the materials from which it is formed or the processing mechanisms employed therein. For example, the processing system 106 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 106, and thus of or for a computing device, may include, but are not limited to, quantum computing, optical computing, mechanical computing (e.g., using nanotechnology), and so forth.

Additionally, although a single memory 108 is shown, a wide variety of types and combinations of memory may be employed, such as random access memory (RAM), hard disk memory, removable medium memory, and other types of computer-readable media.

The computing device 102 is further illustrated as including an operating system 110. The operating system 110 is configured to abstract underlying functionality of the computing device 102 to applications 112 that are executable on the computing device 102. For example, the operating system 110 may abstract the processing system 106, memory 108, network, input/output, and/or display functionality of the computing device 102 such that the applications 112 may be written without knowing "how" this underlying functionality is implemented. The application 112, for instance, may provide data to the operating system 110 to be rendered and displayed by the display device 104 without understanding how this rendering will be performed. The operating system 108 may also represent a variety of other functionality, such as to manage a file system and user interface that is navigable by a user of the computing device 102.

The operating system 108 is also illustrated as including an input/output module 114, which is representative of input/output functionality supported by the operating system 110. Thus, the input/output module 114 is representative of functionality relating to recognition of inputs and/or provision of outputs by the computing device 102. For example, the input/output module 114 may be configured to identify gestures and cause operations to be performed that correspond to the gestures, and so on. The inputs may be detected for processing by the input/output module 114 in a variety of different ways.

For example, the operating system 110 may be configured to receive one or more inputs via touch interaction with a hardware device, such as a controller 116 as illustrated. Touch interaction may involve pressing a button, moving a joystick, movement across a track pad, use of a touch screen of the display device 104 (e.g., detection of a finger of a user's hand 118 or a stylus), and so on. Recognition of the touch inputs may be leveraged by the operating system 110 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The input/output module 114 may also be leveraged by the operating system 110 to support a natural user interface (NUI) that may recognize interactions that may not involve touch. For example, the computing device 102 may include a NUI input device 120. The NUI input device 120 may be configured in a variety of ways to detect inputs without having a user touch a particular device, such as to recognize audio inputs through use of a microphone. For instance, the NUI input device 120 may be configured to support voice recognition to recognize particular utterances (e.g., a spoken command) as well as to recognize a particular user that provided the utterances.

In another example, the NUI input device 120 that may be configured to support recognition of gestures, presented objects, images, and so on through use of a camera. The camera, for instance, may be configured to include multiple lenses so that different perspectives may be captured and thus determine depth. The different perspectives, for instance, may be used to determine a relative distance from the NUI input device 120 and thus a change in the relative distance.

In another example, a time-of-flight camera may be utilized to determine relative distances of objects, e.g., arms, hands, fingers, legs, torso, and head of a user. For instance, the NUI input device 120 may capture images that are analyzed by the input/output module 114 to recognize one or more motions made by a user, including what body part is used to make the motion as well as which user made the motion. An example is illustrated through recognition of positioning and movement of one or more fingers of a user's hand 118 and/or movement of the user's hand 118 as a whole. The motions may be identified as gestures by the NUI input device 120 to initiate a corresponding functions. Thus, the NUI input device 120 may be leveraged to support depth perception in a variety of different ways. The images captured by the NUI input device 120 may be leveraged to provide a variety of other functionality, such as techniques to identify particular users (e.g., through facial recognition), objects, and so on.

A variety of different types of gestures may be recognized, such a gestures that are recognized from a single type of input (e.g., a motion gesture) as well as gestures involving multiple types of inputs, e.g., a motion gesture and an object gesture made using an object such as a stylus. Thus, the NUI input device 120 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the NUI input device 120 may support a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer. Other non-gesture techniques are also contemplated, such as to select one or more buttons of the controller 116.

The operating system 110 is also illustrated as including a viewing mode module 122. The viewing mode module 122 is representative of functionality to manage output of different viewing modes as well as functionality related to those modes, such as menus to be displayed in the respective modes. Although illustrated as part of the operating system 110, the viewing mode module 122 may be implemented in a variety of ways, such as a standalone module, as part of one or more of the applications 112, and so on. A variety of different viewing modes may be supported by the viewing mode module 122, as well as functionality supported in each of the modes, an examples of which is described in greater detail below and shown in a corresponding figure.

Figure 2:
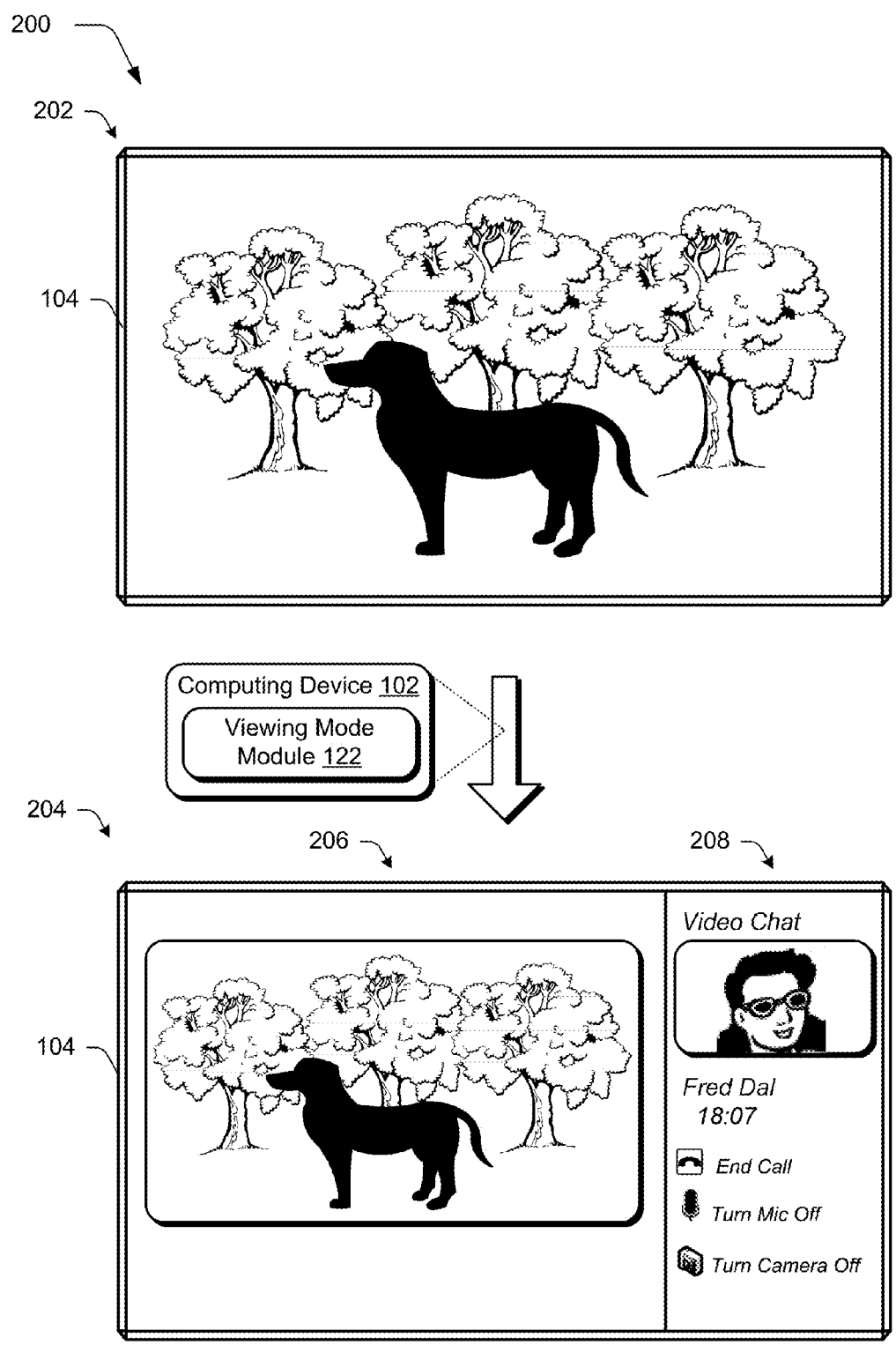
FIG. 2 depicts a system in an example implementation in which an input is received to switch from a full screen mode to a multitasking mode to support simultaneous output of a plurality of applications.

FIG. 2 depicts a system 200 in an example implementation in which an input is received to switch from a full screen mode to a multitasking mode to support simultaneous output of a plurality of applications. This system 200 is illustrated through first and second stages 202, 204. At the first stage 202, a full screen mode is illustrated in which an entirety of a user interface displayed by the display device 104 is used. For example, an application 112 of FIG. 1 may be configured to output live television, play a game, browse the internet, and so on. Accordingly, this mode may be utilized to view an output of an application "as large as possible."

An input may be received by a viewing mode module 122 to switch between the full screen mode of the first stage 202 with a multitasking mode as shown in the second stage 204. A variety of different inputs may be utilized to initiate this switch. For example, a button on the controller 116 may be pressed to initiate the switch, a user utterance (e.g., a voice command), a gesture may be captured through use of touchscreen functionality, a camera (e.g., as part of the NUI input device 120 of FIG. 1), and so on. In another example, portions (e.g., windows) may be dragged to respective edges of a display device 104, a key combination used to specify where to display the portions, and so on. Further, this switch may be performed directly (navigation directly from the full screen mode to the multitasking mode) or indirectly, such as through intermediate navigation to a home screen to select a command (e.g., "snap") and then followed by a selection of a representation (e.g., tile, icon, etc.) of an application that is to share output of the user interface, and so forth.

Recognition of the input may then cause output of the multitasking mode as shown in the second stage 204. In this example, the user interface is divided into first and second portions that include a fill portion 206 and a snap portion 208. The fill portion 206 includes a majority of an available display area of the display device 206 and thus is configured as a "primary" viewing portion. In the illustrated example the fill portion 206 may correspond to an output of an application configured to support live TV viewing, a game, and so on.

The snap portion 208 in this example is smaller (e.g., consumes a lesser display area) than the fill portion 206. The snap portion 208 includes an output of an application as well as functions associated with that application. In the illustrated example, the snap portion 208 is output for a video conferencing application and therefore shows a corresponding user as well as functions associated with the videoconferencing session, such as end call, turn microphone off, turn camera off, and so on. The viewing mode module 122 may configure functionality associated with the viewing mode being utilized as well as which portion of a multitasking view has focus as further described below.

Figure 3:
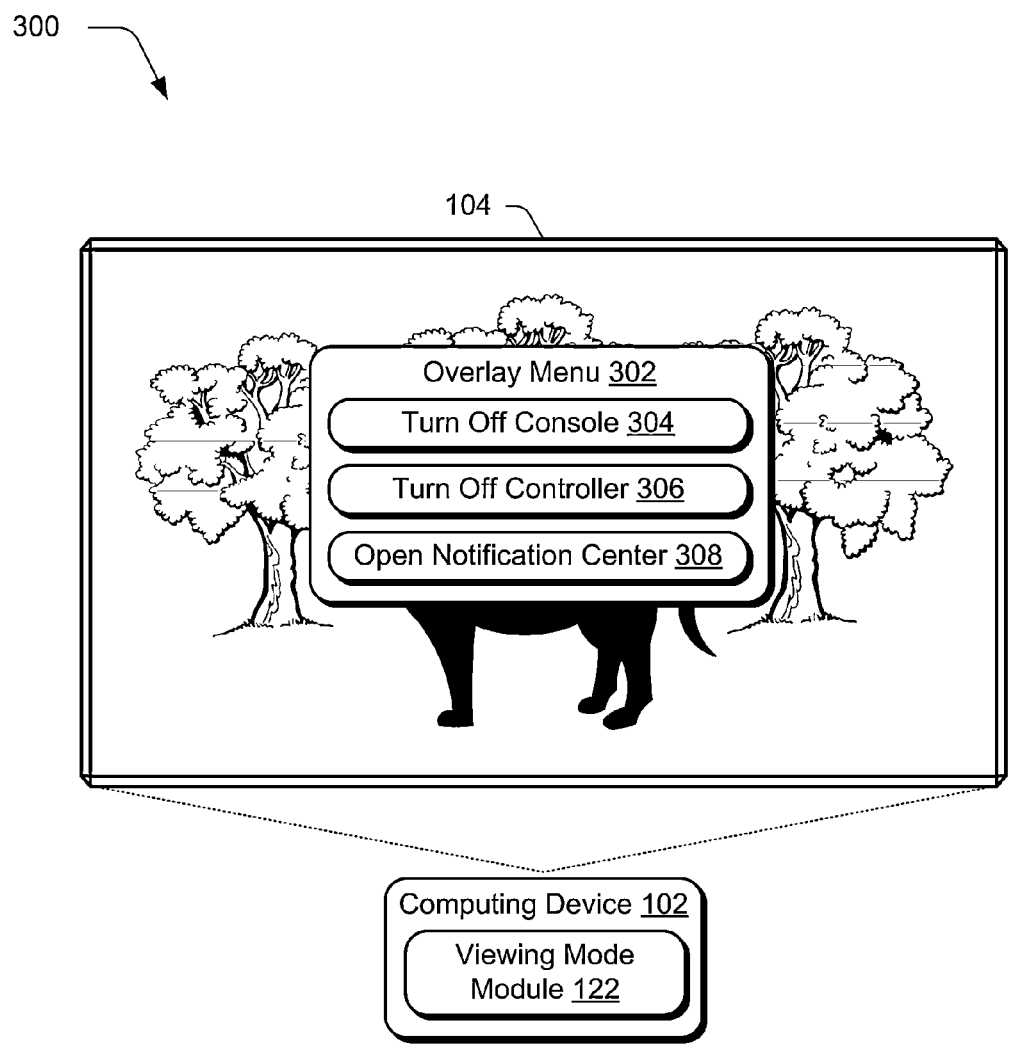
FIG. 3 depicts an example implementation showing output of an overlay menu in a full screen mode by a viewing mode module.

FIG. 3 depicts an example implementation 300 showing output of an overlay menu 302 in a full screen mode by a viewing mode module 122. As previously described the full screen viewing mode may be utilized to consume an approximate entirety of a user interface output by a display device 104, e.g., the full screen viewing mode may still support headers, a title bar to indicate which application is providing the output, and so on.

The viewing mode module 122 may receive an input to cause output of the overlay menu 302, such as through a voice command, gesture, press of a button of the game controller 116 or other hardware input device, and so on. In response, the viewing mode module 122 may ascertain that the computing device 102 is in a full screen mode. Accordingly, the viewing mode module 122 may configure the overlay menu 302 according to this information. This may include positioning, such as to display the overlay menu 302 at an approximate center of the display device 104.

This may also include selection of representations of functions to be included in the overlay menu 302. Examples of such representations are illustrated as a turn off console 304 function that is selectable to cause the computing device 102 to turn off, a turn off controller 306 representation that is selectable to cause the controller 114 or other peripheral device to turn off, and an open notification center 308 representation. The open notification center 308 representation is selectable to cause output of options in the user interface to control and manage output of notifications by the computing device 102. This may include specification of which applications are permitted to output notifications, which notifications in those applications are permitted, as well as how the notifications are output, e.g., a pop-up menu, sound, flash, and so on. Thus, a context in which the overlay menu 302 is to be output may be utilized to configure the overlay menu, which is this instance is a full screen mode.

Figure 4:
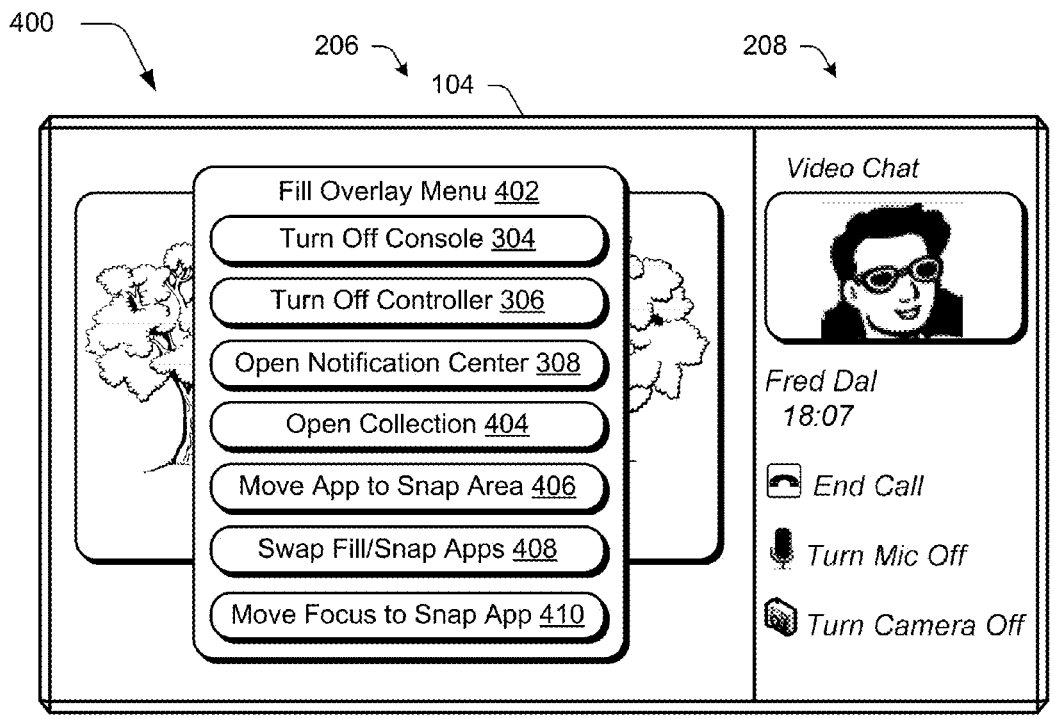
FIG. 4 depicts an example implementation of a multitasking mode in which a fill portion has focus and is utilized as a basis to provide context for an overlay menu.

FIG. 4 depicts an example implementation 400 of a multitasking mode in which a fill portion has focus and is utilized as a basis to provide context for an overlay menu. Focus in a user interface may be utilized to specify which of a plurality of portions are configured to support user interaction, e.g., receive one or more inputs from a user. Focus may be indicated in a variety of ways, such as through use of a border, differentiation in display characteristics (e.g., "graying out" unfocused portions while providing vibrant colors for focused portions), and so forth.

In this example the fill portion 206 includes focus whereas the snap portion 208 does not. Accordingly, the viewing mode module 122 may ascertain a context such that a multitasking mode is active and a particular portion (e.g., the fill portion 206) has focus. The viewing mode module 122 may then use this information to configure the overlay menu, which is illustrated as a fill overlay menu 402 in this example. The viewing mode module 122, for instance, may receive an input like the inputs received in the example of FIG. 3.

In the illustrated example, the fill overlay menu 402 includes representations to turn off console 304, turn off controller 306, and open notification center 308 as before. The fill overlay menu 402 also includes additional representations of functions that were not included in the overlay menu 302 of FIG. 3 and thus the configuration is different. Examples of these representations include an open collection representation 404. The open collection representation 404 is selectable to open a collection, such as music or other media, for output by the computing device 102.

The fill overlay menu 402 also includes representations of functions that are usable to navigate and manage the plurality of portions when in the multitasking mode. For example, the fill overlay menu 402 includes a move app to snap area 406 representation 406 that is selectable to move an output of an application in the fill portion 206 to the snap portion 208. The fill overlay menu 402 also includes a swap fill/snap apps 408 representation that, as the name implies, is selectable to swap output of applications between the fill and snap portions 206, 208. Additionally, the fill overlay menu 402 includes a move focus to snap app 410 representation to move the focus and thus move support of interaction from the fill portion 206 to the snap portion 208. Further, the fill overlay menu 402 has a positioning based on which portion includes the focus, although other examples are also contemplated. Thus, the fill overlay menu 402 may be configured according to both a viewing mode (e.g., a multitasking mode) as well as focus utilized while in that mode, another example of which is described as follows and shown in a corresponding figure.

Figure 5:
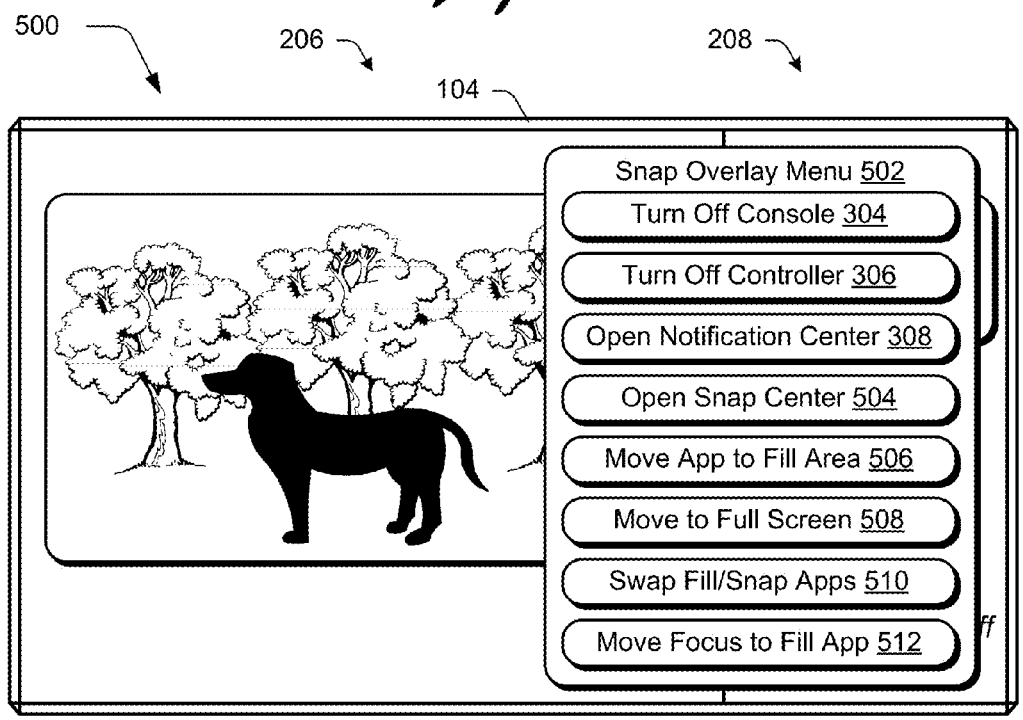
FIG. 5 depicts an example implementation of a multitasking mode in which a snap portion has focus and is utilized as a basis to provide context for an overlay menu.

FIG. 5 depicts an example implementation 500 of a multitasking mode in which a snap portion has focus and is utilized as a basis to provide context for an overlay menu. In this example the snap portion 208 includes focus whereas the fill portion 206 does not. Accordingly, the viewing mode module 122 may ascertain a context such that a multitasking mode is active and a particular portion (e.g., the snap portion 208) has focus. The viewing mode module 122 may then use this information to configure the overlay menu, which is illustrated as a snap overlay menu 502 in this example. The viewing mode module 122, for instance, may receive an input like the inputs received in the example of FIGS. 3 and 4.

In the illustrated example, the snap overlay menu 502 includes representations to turn off console 304, turn off controller 306, and open notification center 308 as before. The fill overlay menu 402 also includes additional representations of functions that were not included in the overlay menu 302 of FIG. 3 nor the fill overlay menu 402 of FIG. 4 and thus the configuration is different.

Examples of these representations include an open snap center representation 504. The open snap center representation 504 is selectable to open a user interface configured to include controls particular to the snap portion 208, such as to control display, volume, size, notifications, and other characteristics. The snap overlay menu 502 also includes representations of functions that are usable to navigate and manage the plurality of portions when in the multitasking mode. For example, the snap overlay menu 502 includes a move app to fill area 506 representation 406 is selectable to move an output of an application in the snap portion 208 to the fill portion 206. The snap overlay menu also includes a move to full screen 508 representation that is selectable to cause the application corresponding to the snap area 208 to be displayed in the full screen mode as shown in FIG. 3.

The snap overlay menu 502 also includes a swap fill/snap apps 510 representation that is selectable to swap output of applications between the fill and snap portions 206, 208. Additionally, the snap overlay menu 502 includes a move focus to snap app 512 representation to move the focus and thus move support of interaction from the snap portion 208 to the fill portion 206. As before, the snap overlay menu 502 has a positioning based at least in part on which portion of the user interface includes the focus, although other examples are also contemplated. In this way, the snap overlay menu 502 may be configured according to both a viewing mode (e.g., a multitasking mode) as well as focus utilized while in that mode. Further, configuration of the overlay menu may be different based of modes as well as focus utilized in those modes. Although this examples was described in relation to a television environment and game console, these techniques may be leveraged in a variety of other environments, such as part of an immersive or desktop shell of an operating system of a mobile device (e.g., tablet, phone), desktop computer, and so on, an example of which is described as follows and shown in a corresponding figure.

Figure 6:
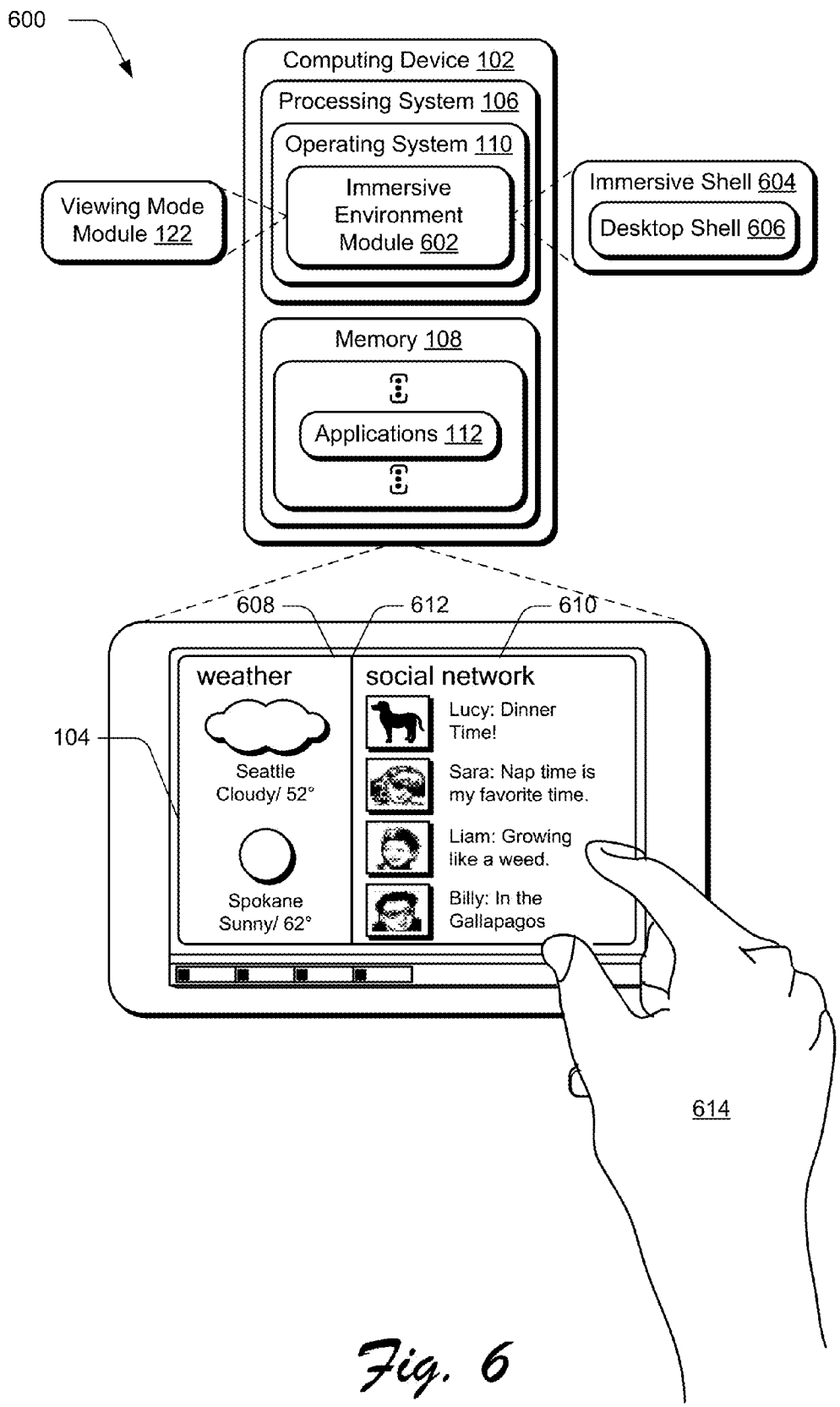
FIG. 6 depicts an example implementation showing use of the menu techniques as part of one or more shells of an operating system.

FIG. 6 depicts an example implementation showing use of the menu techniques as part of one or more shells of an operating system. As previously described, the operating system 110 is configured to abstract underlying functionality of the computing device 102 to applications 112 that are executable on the computing device 102. For example, the operating system 110 may abstract the processing system 106, memory 108, network, and/or display device 104 functionality associated with the computing device 102 such that the applications 112 may be written without knowing "how" this underlying functionality is implemented.

The operating system 108 is also illustrated as including an immersive environment module 602 which is representative of functionality of the computing device 102 to provide an immersive shell 604 via which a user may interact with the applications 112 and other data of the computing device 102, both local to the device as well as remotely via a network. The immersive shell 604 is configured to accept inputs to interact with the operating system 110 and applications 112 of the computing device 102 to access functionality of the computing device 102, such as the abstracted functionality described above. The immersive shell 604 may also be configured to support a desktop shell 606 as further described below.

The immersive shell 604 may be configured to support interaction with the applications 112 with little to no window frame. Additionally, the immersive shell 604 may support interaction with the applications 112 without requiring the user to manage a corresponding window frame's layout, primacy of the window with respect to other windows (e.g., whether a window is active, in front of behind other windows, an order of the windows, and so on). Although illustrated as part of the operating system 110, the immersive environment module 602 may be implemented in a variety of other ways, such as a stand-alone module, remotely via a network, and so forth.

In one or more implementations, the immersive shell 604 of the operating system 110 is configured such that it is not closeable or capable of being uninstalled apart from the operating system 110. Additionally, the immersive shell 604 may be configured to consume a significant portion of an available display area of the display device 104. A user may interact with the immersive shell 604 in a variety of ways, such as via a cursor control device, using one or more gestures, using speech recognition, capture using one or more depth-sensing cameras, and so on.

Thus, the immersive environment module 602 may manage the immersive shell 604 in which content of applications 112 may be presented and the presentation may be performed without requiring a user to manage size, location, primacy, and so on of windows used to display the content of the applications 112.

For example, as shown on a user interface displayed by the display device 104, a user interface is shown that is configured to display data 608, 610 from two applications in a "snapped" configuration. In this example, both of the applications that correspond to the data are enable to actively execute by the computing device 102 while execution is suspended for other of the applications 112 that do not currently display data. A gutter 612 is disposed between the displays of the data 608, 612 that may be moveable to change an amount of display area consumed by applications on the display device 104, respectively.

Thus, in this example the portions and viewing modes are optimized for manual input, such as to use one or more fingers of a user's hand 614. The viewing mode module 112 may manage output of menus and configuration thereof in a manner that follows the above game console example. Thus, the multitasking and full screen menu context techniques described above may be utilized in a wide variety of different environments without departing from the spirit and scope thereof, further discussion of which may be found in relation to the following procedures.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
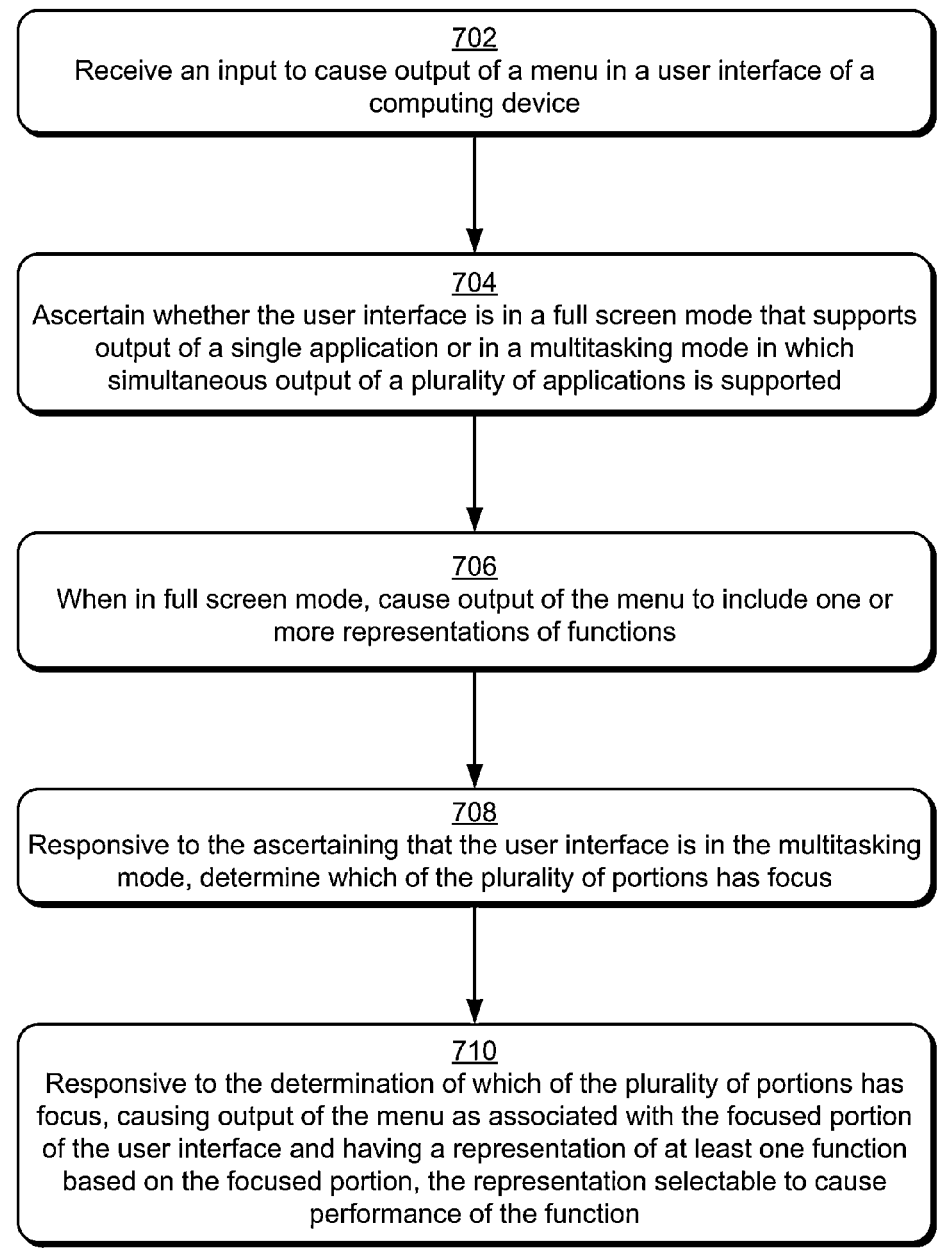
FIG. 7 is a flow diagram depicting a procedure in an example implementation in which a context involving a viewing mode and/or focus in a viewing mode is utilized to configure a user interface.

FIG. 7 depicts a procedure 700 in an example implementation in which a context involving a viewing mode and/or focus in a viewing mode is utilized to configure a user interface. An input is received to cause output of a menu in a user interface of a computing device (block 702). A variety of different inputs may be received, such as through interaction with a single button of a game controller 116, touchscreen functionality, captured using a camera, a voice command, and so on.

A computing device then ascertains whether the user interface is in a full screen mode that support output of a single application or in a multitasking mode in which simultaneous output of a plurality of applications is supported (block 704). The full screen mode as shown in FIG. 3, for instance, may support output of a single one of the applications 112 alone at any one time. The multitasking mode, however, may support simultaneous output of a plurality of applications at any one time, e.g., two, three, four, and so on. When in the full screen mode, output is cause of the menu to include one or more representations of functions (block 706), an example of which is shown in FIG. 3.

Responsive to ascertaining that the user interface is in the multitasking mode, a determination is made as to which of the plurality of portions has focus (block 708). Thus, this determination may be performed to find which of the plurality of applications are configured to receive inputs, currently. Responsive to the determination of which of the plurality of portions has focus, output is caused of a menu as being associated with the focused portion of the user interface and as having a representation of at least one function based on the focused portion. The representation is selectable to cause performance of the function (block 710). As shown and described in relation to FIGS. 3-5, for instance, matching inputs may be utilized to output a menu having different configurations based on a context in which the menu is output. In this way, a user may cause output of the menu in an intuitive manner yet still receive contextual functionality. A variety of other examples are also contemplated as described above.

Example System and Device

Figure 8:
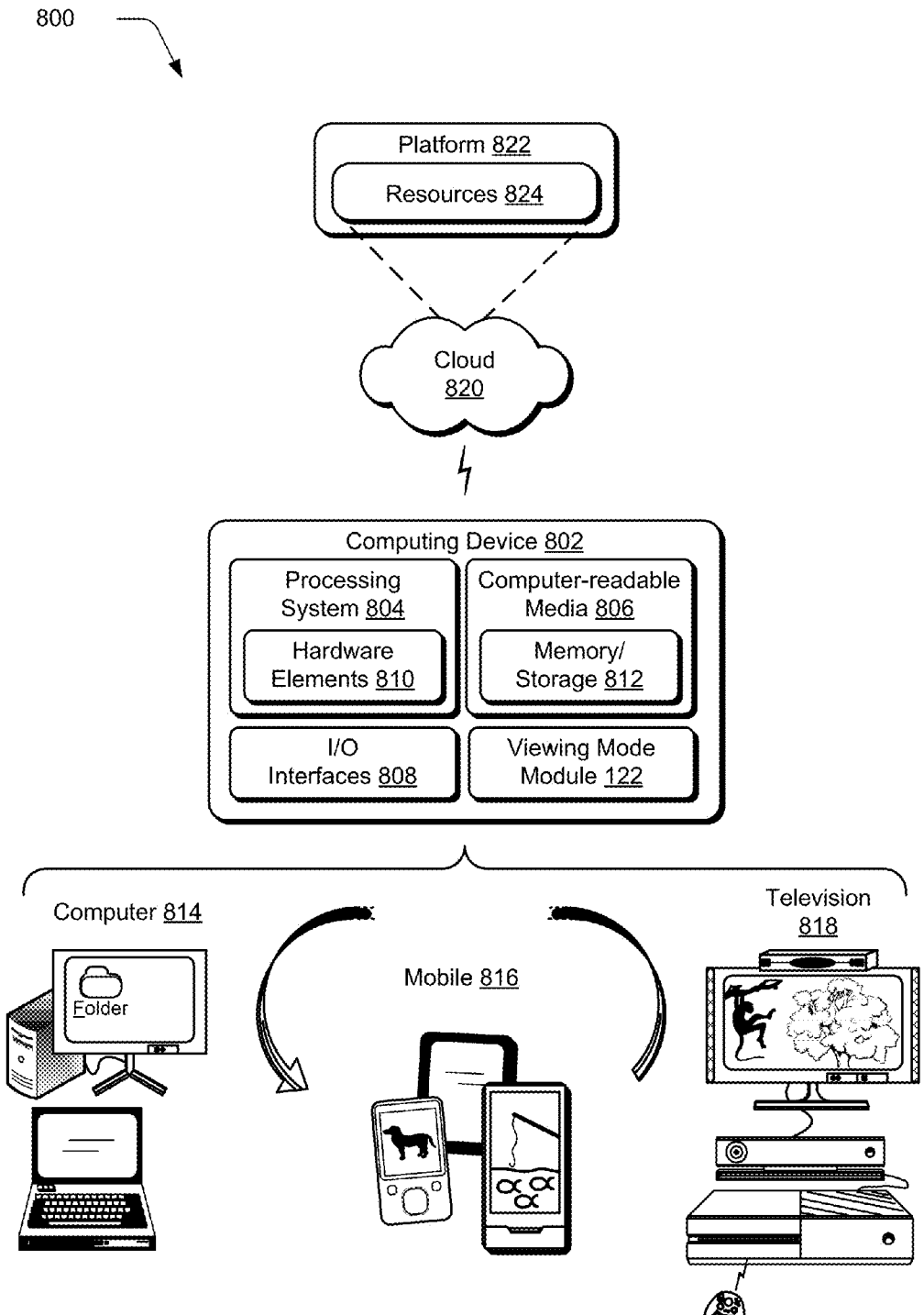
FIG. 8 illustrates various components of an example device that can be implemented as any type of portable and/or computer device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the viewing mode module 112 on the computing device 802. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving an input to cause output of a menu in a user interface of a computing device;
   responsive to the receiving the input:
      ascertaining whether the user interface is in a full screen mode in which output of a single application is disposed in substantially an entirety of the user interface or, alternatively, whether the user interface is in a multitasking mode in which output of the single application and at least one other application is concurrently disposed in the user interface and which of the single application or the one other application is receiving focus,
      displaying an overlay menu with selectable options associated with the at least one of the single application or the at least one other application, wherein the overlay menu is displayed with the single application when the user interface is in the full screen mode, or with the at least one of the single application or the one other application is receiving focus when the user interface is in the multitasking mode, and
      selectively modifying which of a plurality of selectable menu functions are displayed with the overlay menu based on the ascertaining of whether the user interface is in the full screen mode or, alternatively, the multitasking mode, including:
         displaying the overlay menu with a first set of selectable menu functions based on at least a context of the single application when the user interface is in the full screen mode; and
         displaying the overlay menu with a second set of selectable menu functions that is displayed and usable to navigate and manage at least the single application or the one other application when the user interface is in the multitasking mode, wherein the second set of selectable menu functions is different than the first set of selectable menu functions, is chosen according to which of the single application or the one other application is receiving focus, and is at least based on a context of the application receiving focus.

2. A method as described in claim 1, wherein the user interface displays a plurality of portions include a snap portion and a fill portion when in the multitasking mode, the fill portion having a larger size than the snap portion.

3. A method as described in claim 2, wherein the snap and fill portions consume an entirety of a display area of a display device used to output the user interface.

4. A method as described in claim 2, wherein the overlay menu includes representations of one or more functions that are selectable to navigate between the plurality of portions of the multitasking mode.

5. A method as described in claim 2, wherein the overlay menu includes representations of one or more functions that are selectable to cause the applications that correspond to the plurality of portions to be swapped.

6. A method as described in claim 1, wherein the overlay menu includes representations of one or more functions involved in controlling power of the computing device or a peripheral device of the computing device.

7. A method as described in claim 1, wherein the overlay menu includes representations of one or more functions that are selectable to cause output of functionality to control notification output by the computing device.

8. A method as described in claim 1, wherein the overlay menu includes representations of one or more functions that are selectable to change the focus.

9. A method as described in claim 1, wherein the at least one function of the selectable menu functions is available in the overlay menu when the focus is directed to a first of a plurality of portions displayed by the user interface and is not available when the focus is directed to at least one other portion of the plurality of portions of the user interface.

10. A method as described in claim 1, wherein the overlay menu displays more of the selectable menu functions when the user interface is in the multitasking mode than when the user interface is in the full screen mode.

11. A method as described in claim 1, wherein the input is recognized from a gesture captured through use of one or more cameras.

12. A computing device comprising:
a processing system that includes at least one hardware processor; and
memory configured to maintain one or more instructions, the one or more instructions executable by the processing system to cause operations to be performed comprising:
receiving an input to cause output of a menu in a user interface of a computing device;
responsive to the receiving the input:
ascertaining whether the user interface is in a full screen mode in which output of a single application is disposed in substantially an entirety of the user interface or, alternatively, whether the user interface is in a multitasking mode in which output of the single application and at least one other application is concurrently disposed in the user interface and which of the single application or the one other application is receiving focus,
displaying an overlay menu with selectable options associated with the at least one of the single application or the at least one other application, wherein the overlay menu is displayed with the single application when the user interface is in the full screen mode, or with the at least one of the single application or the one other application is receiving focus when the user interface is in the multitasking mode, and
selectively modifying which of a plurality of selectable menu functions are displayed with the overlay menu based on the ascertaining of whether the user interface is in the full screen mode or, alternatively, the multitasking mode, including:
displaying the overlay menu with a first set of selectable menu functions when the user interface is in the full screen mode; and
displaying the overlay menu with a second set of selectable menu functions that is displayed and usable to navigate and manage at least the single application or the one other application when the user interface is in the multitasking mode, wherein the second set of selectable menu functions is different than the first set of selectable menu functions, is chosen according to which of the single application or the one other application is receiving focus, and is at least base on a context of the application receiving focus.

13. A computing device as described in claim 12, wherein the single application and the at least one other application include a live television application and a game application.

14. A computing device as described in claim 12, further comprising one or more camera configured to capture one or more images, from which, the input is recognizable as a gesture.

15. A computing device as described in claim 12, further comprising one or more microphones configured to capture one or more user utterances, from which, the input is recognizable.

16. A computing device as described in claim 12, further comprising a game controller that is configured to support user interaction to initiate the input.

17. A computing device as described in claim 12, wherein the overlay menu displays more of the selectable menu functions when the user interface is in the multitasking mode than when the user interface is in the full screen mode.

18. One or more computer hardware storage devices having computer readable instructions stored thereon that, responsive to execution by a processor, causes a computing device to perform operations comprising:
responsive to receipt of an input to cause output of a menu, ascertaining whether a user interface output by the computing device is in a full screen mode in which an output of a single application consumes substantially an entirety of the user interface or, alternatively, in a multitasking module in which a plurality of portions are displayed concurrently in the user interface and which of the single application or the plurality of portions is receiving focus, each corresponding to a respective one of a plurality of applications; and
responsive to the ascertaining, displaying an overlay menu with selectable options associated with the at least one of the single application or the respective one of the plurality of applications, wherein the overlay menu is displayed with the single application when the user interface is in the full screen mode, or with the at least one of the single application or the respective one of the plurality of applications is receiving focus when the user interface is in the multitasking mode, and selectively causing the menu to display different configurations of selectable menu functions with the overlay menu when the user interface is in the full screen mode than when the user interface is in the multitasking mode, including:
displaying the overlay menu with a first set of selectable menu functions when the user interface is in the full screen mode; and
displaying the overlay menu with a second set of selectable menu functions that is displayed and usable to navigate and manage one of the plurality of applications when the user interface is in the multitasking mode, wherein the second set of selectable menu functions is different than the first set of selectable menu functions, is chosen according to which of the single application or the respective one of the plurality of applications is receiving focus, and is at least based on a context of the application receiving focus.

19. One or more computer-readable storage media as described in claim 18, wherein the full screen mode and the multitasking mode corresponds to an immersive shell of an operating system, the multitasking mode having a divider that is selectable to change a size of both fill and snap portions of the user interface.

\* \* \* \* \*